United States Patent
Kujime et al.

(10) Patent No.: US 10,766,310 B2
(45) Date of Patent: Sep. 8, 2020

(54) PNEUMATIC TIRE

(71) Applicant: Sumitomo Rubber Industries, Ltd., Kobe-shi, Hyogo (JP)

(72) Inventors: Tomoyuki Kujime, Kobe (JP); Hiroshi Okagawa, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 282 days.

(21) Appl. No.: 15/710,304

(22) Filed: Sep. 20, 2017

(65) Prior Publication Data
US 2018/0079261 A1  Mar. 22, 2018

(30) Foreign Application Priority Data
Sep. 21, 2016  (JP) ................. 2016-184541

(51) Int. Cl.
*B60C 11/00* (2006.01)
*B60C 11/12* (2006.01)
*B60C 11/03* (2006.01)

(52) U.S. Cl.
CPC ...... *B60C 11/1236* (2013.01); *B60C 11/0083* (2013.01); *B60C 11/0304* (2013.01);
(Continued)

(58) Field of Classification Search
CPC .................................. B60C 11/0083
See application file for complete search history.

(56) References Cited

U.S. PATENT DOCUMENTS 4,756,352 A * 7/1988 Ogawa .............. B60C 11/01
152/209.14
5,830,294 A * 11/1998 Shibata ............. B60C 11/0083
152/209.1
(Continued)

FOREIGN PATENT DOCUMENTS

JP   2013-60129 A   4/2013
JP   2016-22800 A   2/2016

OTHER PUBLICATIONS

JP2013060129 machine translation as provided by https://www.j-platpat.inpit.go.jp/p0200 (Year: 2013).*
(Continued)

*Primary Examiner* — Alison L Hindenlang
*Assistant Examiner* — Shibin Liang
(74) *Attorney, Agent, or Firm* — Birch, Stewart, Kolasch & Birch, LLP (57) ABSTRACT

A pneumatic tire includes a tread portion provided with a crown land region and middle land regions provided with only sipes, and shoulder land regions provided with shoulder rug grooves and connecting sipes. The tread portion is provided with a crown tread profile having a radius of curvature, a middle tread profile having a radius of curvature, and a shoulder tread profile having a radius of curvature which satisfy a magnitude relation Rc>Rm>Rs. First interconnecting positions at which the crown tread profile connects with the middle tread profiles are positioned in the respective middle land regions. Second interconnecting positions at which the middle tread profiles connect with the shoulder tread profiles are positioned in the respective shoulder land regions and axially inside the inner ends of the shoulder rug grooves.

19 Claims, 7 Drawing Sheets

(52) U.S. Cl.
CPC ... *B60C 11/1204* (2013.01); *B60C 2011/0341* (2013.01); *B60C 2011/0346* (2013.01); *B60C 2011/0353* (2013.01); *B60C 2011/0358* (2013.01); *B60C 2011/0381* (2013.01)

(56) References Cited

U.S. PATENT DOCUMENTS

| | | | | |
|---|---|---|---|---|
| 6,167,932 B1* | 1/2001 | Yamamoto | ................ | B60C 3/00 |
| | | | | 152/209.1 |
| 7,077,181 B2* | 7/2006 | Hirai | ................ | B60C 11/0318 |
| | | | | 152/209.18 |
| 9,045,007 B2* | 6/2015 | Yamahira | ................ | B60C 11/01 |
| 9,174,497 B2* | 11/2015 | Dobashi | ................ | B60C 11/0318 |
| 9,789,736 B2* | 10/2017 | Munezawa | ................ | B60C 11/04 |
| 9,981,508 B2* | 5/2018 | Takemoto | ................ | B60C 11/1236 |
| 10,160,267 B2* | 12/2018 | Ogihara | ................ | B60C 11/1307 |
| 10,202,007 B2* | 2/2019 | Oba | ................ | B60C 11/0306 |
| 2010/0224296 A1* | 9/2010 | Dobashi | ................ | B60C 11/1392 |
| | | | | 152/209.18 |
| 2010/0314012 A1* | 12/2010 | Hada | ................ | B60C 11/0306 |
| | | | | 152/209.16 |
| 2011/0024012 A1* | 2/2011 | Iwai | ................ | B60C 11/0306 |
| | | | | 152/209.27 |
| 2012/0160385 A1* | 6/2012 | Tanaka | ................ | B60C 11/1369 |
| | | | | 152/209.22 |
| 2012/0227881 A1* | 9/2012 | Kudo | ................ | B60C 11/0306 |
| | | | | 152/209.14 |
| 2012/0285592 A1* | 11/2012 | Kameda | ................ | B60C 11/1392 |
| | | | | 152/209.8 |
| 2013/0092304 A1* | 4/2013 | Murata | ................ | B60C 11/0306 |
| | | | | 152/209.18 |
| 2013/0118663 A1* | 5/2013 | Kishizoe | ................ | B60C 11/12 |
| | | | | 152/209.18 |
| 2013/0167997 A1* | 7/2013 | Hayashi | ................ | B60C 11/04 |
| | | | | 152/209.18 |
| 2013/0213545 A1* | 8/2013 | Tanaka | ................ | B60C 3/04 |
| | | | | 152/454 |
| 2014/0090759 A1* | 4/2014 | Tanaka | ................ | B60C 11/0306 |
| | | | | 152/209.8 |
| 2014/0166169 A1* | 6/2014 | Tanaka | ................ | B60C 11/1376 |
| | | | | 152/209.15 |
| 2014/0283967 A1* | 9/2014 | Inoue | ................ | B60C 11/12 |
| | | | | 152/209.18 |
| 2014/0332133 A1* | 11/2014 | Atake | ................ | B60C 11/0083 |
| | | | | 152/209.15 |
| 2015/0273948 A1* | 10/2015 | Kamigori | ................ | B60C 5/00 |
| | | | | 152/209.8 |
| 2015/0273951 A1* | 10/2015 | Yamakawa | ................ | B60C 11/1369 |
| | | | | 152/209.25 |
| 2015/0298508 A1* | 10/2015 | Yamakawa | ................ | B60C 11/1236 |
| | | | | 152/209.21 |
| 2015/0352905 A1* | 12/2015 | Tanaka | ................ | B60C 11/1272 |
| | | | | 152/209.18 |
| 2016/0082780 A1* | 3/2016 | Nagahara | ................ | B60C 11/042 |
| | | | | 152/209.18 |
| 2016/0236517 A1 | 8/2016 | Nagase | | |
| 2017/0100965 A1* | 4/2017 | Kikuchi | ................ | B60C 11/1218 |
| 2019/0009616 A1* | 1/2019 | Kawazu | ................ | B60C 11/1204 |

OTHER PUBLICATIONS

Extended European Search Report for European Application No. 17189606.1, dated Feb. 9, 2018.

* cited by examiner

PNEUMATIC TIRE

TECHNICAL FIELD

The present invention relates to a pneumatic tire, more particularly to a structure of the tread portion capable of improving the steering stability.

BACKGROUND ART

Japanese Patent Application Publication No. 2013-60129 discloses a pneumatic tire, wherein, in order to improve steering stability and uneven wear of the tire, the tread is provided with a triple-radius profile, and two interconnecting positions of the three curvatures on each side of the tire equator are positioned on a singe circumferential rib. However, such tire has room for further improvement in the steering stability.

SUMMARY OF THE INVENTION

It is therefore, an object of the present invention to provide a pneumatic tire having a tread portion capable of improving the steering stability.

According to the present invention, a pneumatic tire comprises:

a tread portion provided with four circumferentially continuously extending main grooves including a pair of crown main grooves and a pair of shoulder main grooves so that the tread portion is axially divided into five land regions including a crown land region disposed on the tire equator, two axially outermost shoulder land regions and two middle land regions, wherein the crown land region and the middle land regions are provided with only sipes defined as having a width of less than 2 mm, the shoulder land regions are each provided with shoulder rug grooves each extending axially inwardly from the tread edge to have an axially inner end within the shoulder land region, and connecting sipes extending from the axially inner ends of the respective shoulder rug grooves to the shoulder main groove, in a meridional cross section of the tire under a normally inflated unloaded condition, the tread portion is provided with a tread profile made up of a crown tread profile including the tire equator, a middle tread profile on each side of the crown tread profile, and a shoulder tread profile on the axially outside of each of the middle tread profiles, wherein the crown tread profile which is a radially outwardly convexed arc having a radius of curvature Rc, the middle tread profile which is a radially outwardly convexed arc having a radius of curvature Rm, and the shoulder tread profile which is a radially outwardly convexed arc having a radius of curvature Rs satisfy a magnitude relation Rc>Rm>Rs, first interconnecting positions at which the crown tread profile connects with the middle tread profiles are positioned in the respective middle land regions, and second interconnecting positions at which the middle tread profiles connect with the shoulder tread profiles are positioned in the respective shoulder land regions and axially inside the axially inner ends of the shoulder rug grooves.

Further, the pneumatic tire according to the present invention may have the following features (1)-(6):
(1) the radius of curvature Rc is 500 to 2500 mm, the radius of curvature Rm is 0.50 to 0.70 times the radius of curvature Rc, and the radius of curvature Rs is 0.15 to 0.35 times the radius of curvature Rc;
(2) the axial length of each of the connecting sipes is 0.15 to 0.30 times the axial width of the shoulder land regions;
(3) the middle land regions are each provided with a plurality of middle sipes extending across the entire width of the middle land region, and
the crown land region is provided with a plurality of crown sipes extending from the crown main grooves and terminating within the crown land region;
(4) each of the middle sipes is smoothly continued to one of the connecting sipes through the shoulder main groove;
(5) each of the crown sipes is smoothly continued to one of the middle sipes through the crown main groove;
(6) each of the connecting sipes, the middle sipes and the crown sipes comprises a radially outer wide part opened at the tread face of the tread portion, and a radially inner narrow part having a width less than the width at the opening of the wide part.

In this application including specification and claims, various dimensions, positions and the like of the tire refer to those under a normally inflated unloaded condition of the tire unless otherwise noted.

The tread edges Te1 and Te2 are the axial outermost edges of the ground contacting patch of the tire which occurs under a normally inflated loaded condition when the camber angle of the tire is zero.

The tread width TW is the width measured under the normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The term "sipe" means a narrow groove having a width less than 2.0 mm inclusive of a cut having no substantial width.

The expression "a sipe x is smoothly continued to a sipe Y through a main groove z" means that an extension of the sipe x extended in a tangential direction to the sipe x at the intersection with the main groove z overlaps with the sipe Y at the intersection with the main groove z.

In the pneumatic tire according to the present invention, the crown and middle land regions provided with only the sipes, and the shoulder land regions provided with the shoulder rug grooves and connecting sipes can maintain rigidity, and exert superior steering stability.

In general, when the ground pressure is applied to the tread portion, there is a tendency that deformation of the tread portion concentrates on the interconnecting positions. However, in the present invention, as the first interconnecting position is in the rigid middle land region, the deformation of the tread portion can be prevented from concentrating on the first interconnecting position in the middle land region. Further, as the second interconnecting position is in a rigid portion of the shoulder land region axially inside the axially inner ends of the shoulder rug grooves, the deformation of the tread portion can be prevented from concentrating on the second interconnecting position in the shoulder land region.

In the present invention, therefore, it is possible to effectively prevent the deformation of the tread portion from concentrating on the interconnecting positions, therefore, superior steering stability can be obtained.

DESCRIPTION OF THE PREFERRED EMBODIMENTS

The present invention can be suitably applied to a pneumatic tire for passenger cars.

Taking a passenger car tire as an example, embodiments of the present invention will now be described in detail in conjunction with the accompanying drawings.

As well known in the art, a pneumatic tire comprises a tread portion whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
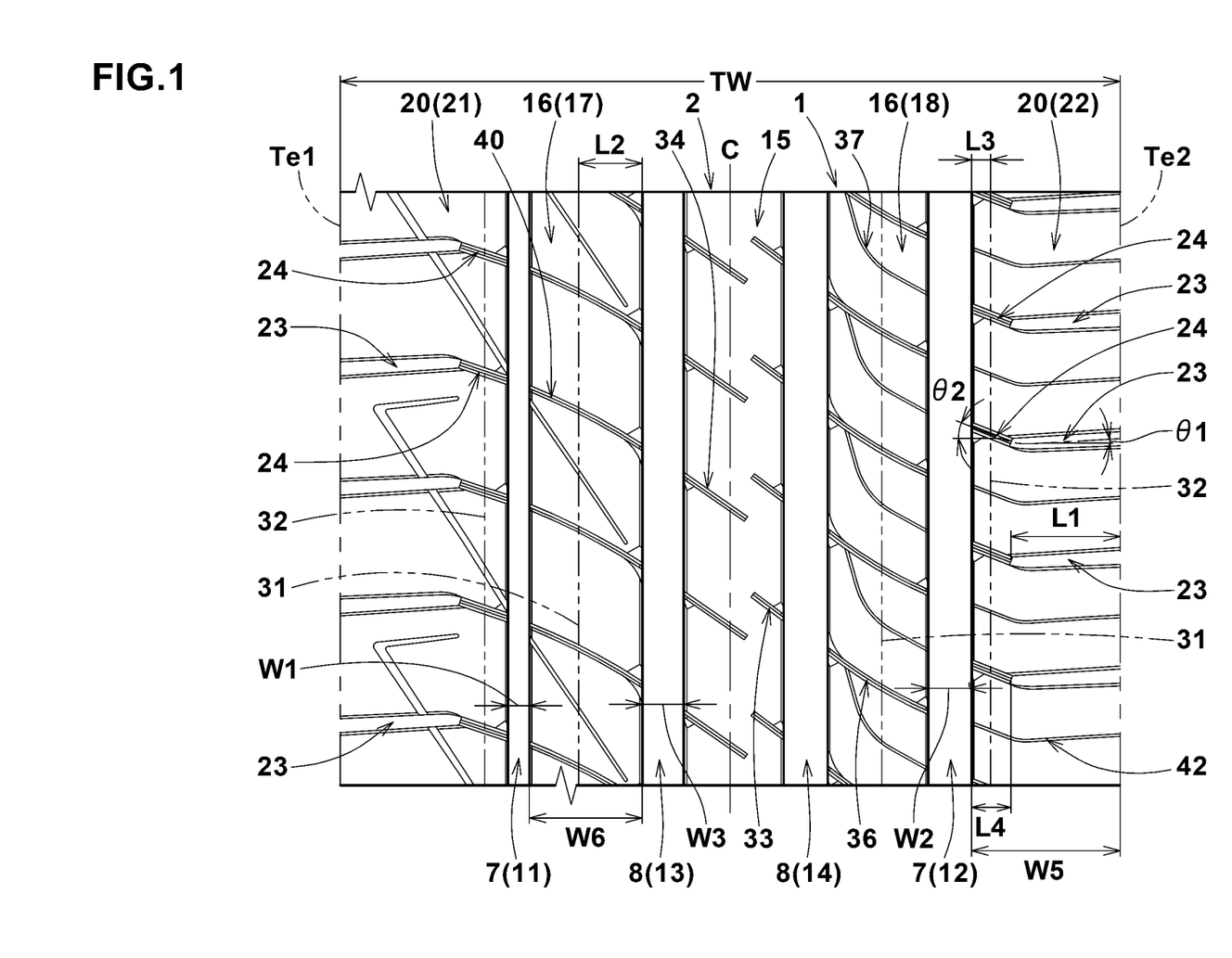
FIG. 1 is a developed partial plan view of a pneumatic tire as an embodiment of the present invention showing the tread portion.

As shown in FIG. 1, a pneumatic tire 1 as an embodiment of the present invention comprises a tread portion 2 provided with an asymmetrical tread pattern, and the mounting position of the tire, namely, which side of the tire is outside, is specified by an indication such as characters and marking provided on the tire sidewall portion (not shown). The tread portion 2 has an outboard tread edge Te1 to be positioned away from the center of a vehicle body, and an inboard tread edge Te2 to be positioned close to the center of the vehicle body.

The tread portion 2 is provided with a plurality of main grooves extending continuously in the tire circumferential direction.

In the present embodiment, each of the main grooves extends straight in parallel with the tire circumferential direction. However, all or some of the main grooves 5 may be a zigzag or wavy groove.

The main grooves are a pair of crown main grooves 8 disposed one on each side of the tire equator C, and a pair of axially outermost shoulder main grooves 7 disposed axially outside the respective crown main grooves 8.

The crown main grooves 8 are an outboard crown main groove 13 between the tire equator C and the outboard tread edge Te1, and an inboard crown main groove 14 between the tire equator C and the inboard tread edge Te2.

The shoulder main grooves 7 are an outboard shoulder main groove 11 between the outboard crown main groove 13 and the outboard tread edge Te1, and an inboard shoulder main groove 12 between the inboard crown main groove 14 and the inboard tread edge Te2.

It is preferable that the axial distance from the tire equator C to the widthwise center line of each of the crown main grooves 8 is 0.05 to 0.15 times the tread width TW.

It is preferable that the distance from the tire equator C to the widthwise center line of each of the shoulder main grooves 7 is 0.20 to 0.35 times the tread width TW.

It is preferable that the groove width w2 of the inboard shoulder main groove 12 and the groove width w3 of each of the crown main grooves 8 are 3% to 7% of the tread width TW.

It is preferable that the outboard shoulder main groove 11 has the smallest groove width w1 in the main grooves. It is preferable that the groove width w1 of the outboard shoulder main groove 11 is 2% to 4% of the tread width TW. such main grooves improve the wet performance and steering stability in good balance.

It is preferable that the groove depth of each of the main grooves is 5 to 10 mm in the case of a passenger car tire.

By the main grooves 11-14, the tread portion 2 is axially divided into five land regions: a crown land region 15 centered on the tire equator C, a pair of middle land regions 16 on both sides of the crown land region 15, and a pair of shoulder land regions 20 axially outside the middle land regions 16.

The middle land regions 16 are an outboard middle land region 17 between the outboard crown main groove 13 and the outboard shoulder main groove 11, and an inboard middle land region 18 between the inboard crown main groove 14 and the inboard shoulder main groove 12.

The shoulder land regions 20 are an outboard shoulder land region 21 between the outboard shoulder main groove 11 and the outboard tread edge Te1, and an inboard shoulder land region 22 between the inboard shoulder main groove 12 and the inboard tread edge Te2.

Each of the crown land region 15 and the middle land regions 16 is provided with only sipes.

Each of the shoulder land regions 20 is provided with a plurality of shoulder rug grooves 23 extending axially inwardly from the tread edge to have axially inner ends within the shoulder land region 20, and connecting sipes 24 extending from the axially inner ends of the respective shoulder rug grooves 23 to the shoulder main groove 7.

It is preferable that the axial lengths L1 of the shoulder rug grooves 23 are 0.70 to 0.85 times the axial width w5 of the shoulder land region 20.

In the present embodiment, the shoulder rug grooves 23 are slightly inclined with respect to the tire axial direction to one direction so as to smoothly lead the water existing in the grooves toward the tread edges during wet running. Preferably, the angles θ1 of the shoulder rug grooves 23 are not more than 5 degrees with respect to the tire axial direction.

The axial length L4 of the connecting sipes 24 is less than that of the shoulder rug grooves 23. Preferably, the axial length L4 is 0.15 to 0.30 times the axial width w5 of the shoulder land region 20.

In the present embodiment, the connecting sipes 24 are slightly inclined with respect to the tire axial direction to the opposite direction to the shoulder rug grooves 23. Preferably, the angles θ2 of the connecting sipes 24 with respect to the tire axial direction are more than the angles θ1 of the shoulder rug grooves 23 with respect to the tire axial direction. For example, the angle θ2 is set in a range from 20 to 30 degrees.

A circumferential zone between the inner ends of the shoulder rug grooves 23 and the shoulder main groove 7 may be provided with only the connecting sipes 24.

Figure 2:
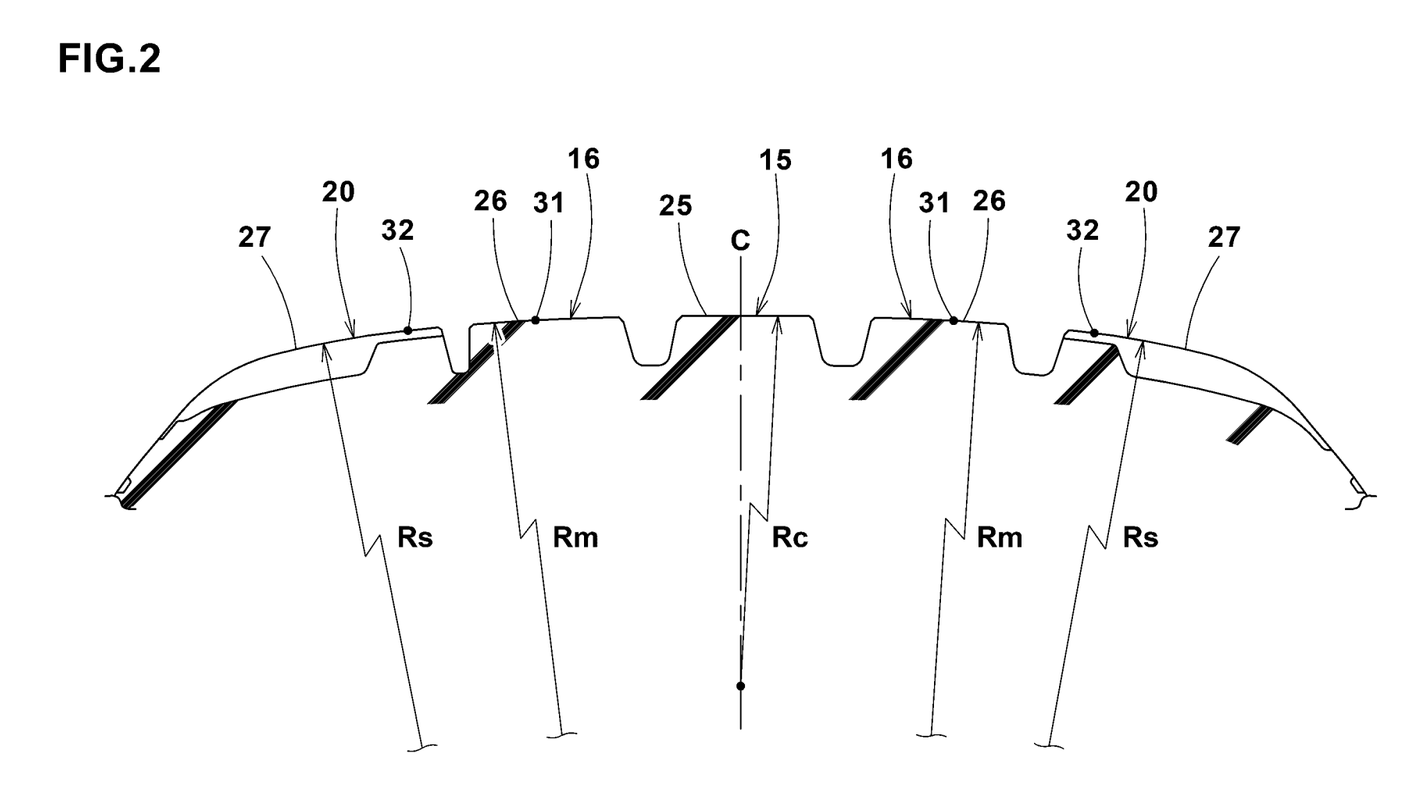
FIG. 2 is a schematic cross sectional view of the tread portion of the pneumatic tire under the normally inflated unloaded condition.

According to the present invention, a shown in FIG. 2, the tread portion 2 is provided with a tread profile made up of a crown tread profile 25 centered on the tire equator C, a middle tread profile 26 on each side of the crown tread profile 25, and a shoulder tread profile 27 on the axially outside of each of the middle tread profiles 26.

The crown tread profile 25 is a radially outwardly convexed arc having a radius of curvature Rc. The middle tread profile 26 is a radially outwardly convexed arc having a radius of curvature Rm. The shoulder tread profile 27 is a radially outwardly convexed arc having a radius of curvature Rs.

The radii Rc, Rm and Rs satisfy a magnitude relation Rc>Rm>Rs. Thereby, it becomes possible to apply the ground pressure to the entire tread portion 2, and thereby superior steering stability and ride comfort can be obtained.

For that purpose, first interconnecting positions 31 at which the crown tread profile 25 connects with the middle tread profiles are positioned in the respective middle land regions 16, and second interconnecting positions 32 at which the middle tread profiles 26 connect with the shoulder tread profiles 27 are positioned in the respective shoulder land regions 20 and axially inside the axially inner ends of the shoulder rug grooves 23.

In general, there is a tendency that, when the tread portion 2 is applied by the ground pressure, deformation of the tread portion 2 becomes larger in the vicinities of the interconnecting positions of the profiles.

In the present invention, as the first interconnecting position 31 is set on the rigid middle land region 16, the large deformation when the tread portion 2 is subjected to the ground pressure can be prevented from occurring in the vicinity of the first interconnecting position 31 in the middle land region 16. Further, as the second interconnecting position 32 is set on a rigid portion of the shoulder land region 20 axially inside the inner ends of the shoulder rug grooves 23, the large deformation when the tread portion 2 is subjected to the ground pressure can be prevented from occurring in the vicinity of the second interconnecting position 32 in the shoulder land region 20. In the present invention, accordingly, the concentration of the deformation on the interconnecting positions of the profiles can be effectively prevented, and superior steering stability can be obtained.

In FIG. 1, the first interconnecting positions 31 and the second interconnecting positions 32 are indicated by alternate long and two short dashes line.

In order to effectively derive the above described advantageous effect, the axial distance L2 of the first interconnecting position 31 from the axially inner edge of the middle land region 16 is preferably set in a range from 0.40 to 0.60 times the axial width w6 of the middle land region 16.

Further, the second interconnecting position 32 is preferably set in the vicinity of the midpoint in the tire axial direction of the connecting sipes 24. More specifically, the axial distance L3 of the second interconnecting position 32 from the axially inner edge of the shoulder land region 20 is preferably set in a range from 0.40 to 0.60 times the axial length L4 of the connecting sipes 24.

The radius of curvature Rc of the crown tread profile 25 is set in a range from 500 to 2500 mm in the case of a passenger car tire.

In order to apply the ground pressure suitable for the respective land regions, the radius of curvature Rm of the middle tread profiles 26 is preferably not less than 0.50 times, more preferably not less than 0.55 times, but preferably not more than 0.70 times, more preferably not more than 0.65 times the radius of curvature Rc of the crown tread profiles 25, and the radius of curvature Rs of the shoulder tread profiles 27 is preferably not less than 0.15 times, more preferably not less than 0.20 times, but preferably not more than 0.35 times, more preferably not more than 0.30 times the radius of curvature Rc of the crown tread profiles 25.

Figure 3:
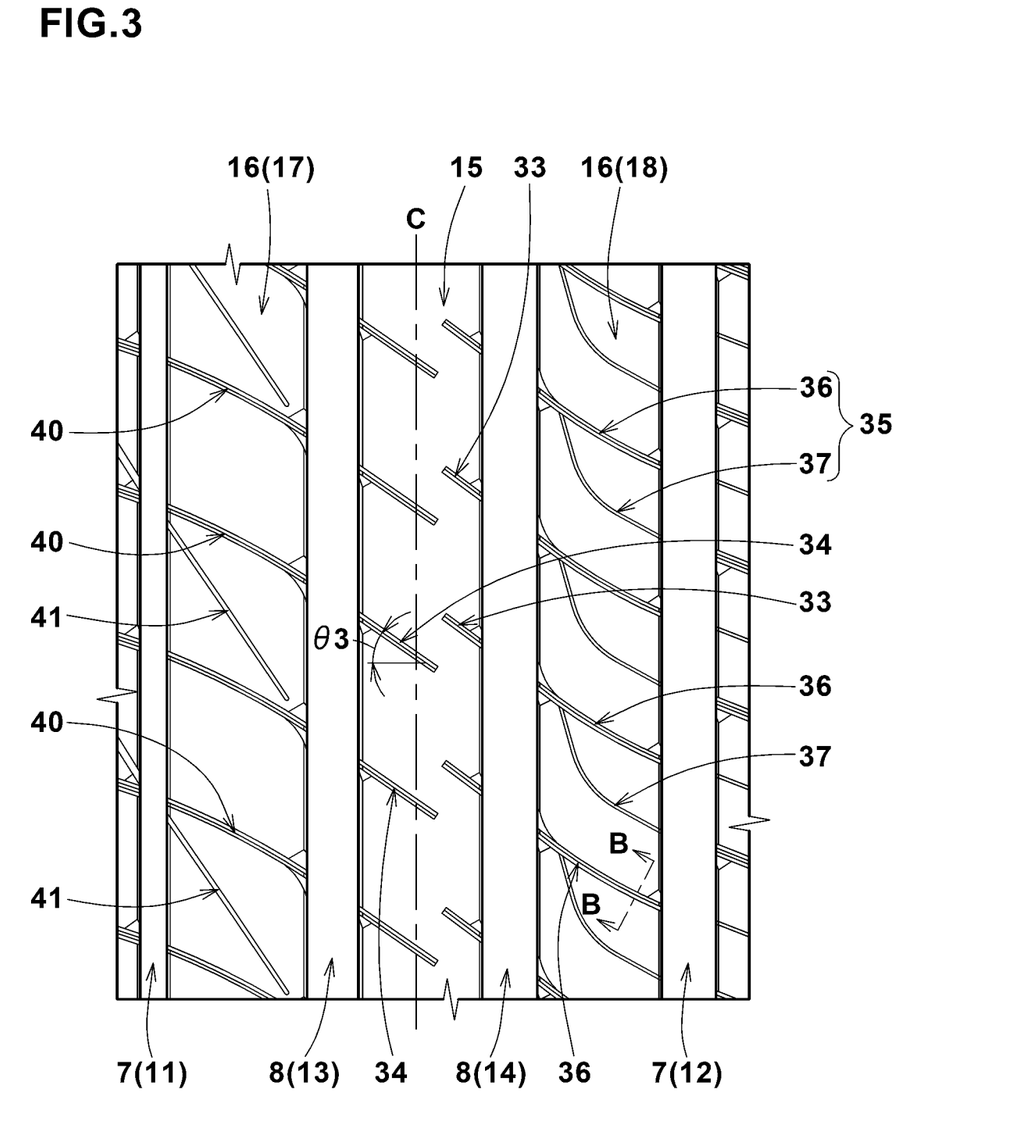
FIG. 3 is an enlarged view showing the crown land region and the middle land regions.

As shown in FIG. 3, the crown land region 15 is provided with inboard crown sipes 33 extending from the inboard crown main groove 14 toward the tire equator C, and outboard crown sipes 34 extending from the outboard crown main groove 13 toward the tire equator C.

The outboard crown sipes 34 extend beyond the tire equator C and terminate within the crown land region 15.

The inboard crown sipes 33 terminate within the crown land region 15 without reaching the tire equator C.

The crown sipes 33 and 34 are inclined in the same direction with respect to the tire axial direction, for example, at an angle θ3 in a range from 30 to 40 degrees with respect to the tire axial direction.

Such crown sipes 33 and 34 appropriately mitigate the rigidity of the crown land region 15 and improve the steering stability and ride comfort in good balance.

The inboard middle land region 18 is provided with a plurality of inboard middle sipes 35 extending from the inboard shoulder main groove 12.

In the present embodiment, the inboard middle sipes 35 are first inboard middle sipes 36 and second inboard middle sipes 37.

The first inboard middle sipes 36 extend from the inboard shoulder main groove 12 to the inboard crown main groove 14. The second inboard middle sipes 37 are disposed alternately with the first inboard middle sipes 36, and extend axially inwardly from the inboard shoulder main groove 12, while curving toward the respective first inboard middle sipes 36, so that the second inboard middle sipes 37 have axially inner ends connected to the respective first inboard middle sipes 36 within the inboard middle land region 18.

such inboard middle sipes 35 can improve the edge effect while maintaining the rigidity of the axially inner portion of the inboard middle land region 18.

The outboard middle land region 17 is provided with a plurality of outboard middle sipes 40 extending across the entire axial width of the land region.

The outboard middle sipe 40 has a cross sectional structure which is the same as the first inboard middle sipes 36 disposed in the inboard middle land region 18.

Figure 4:
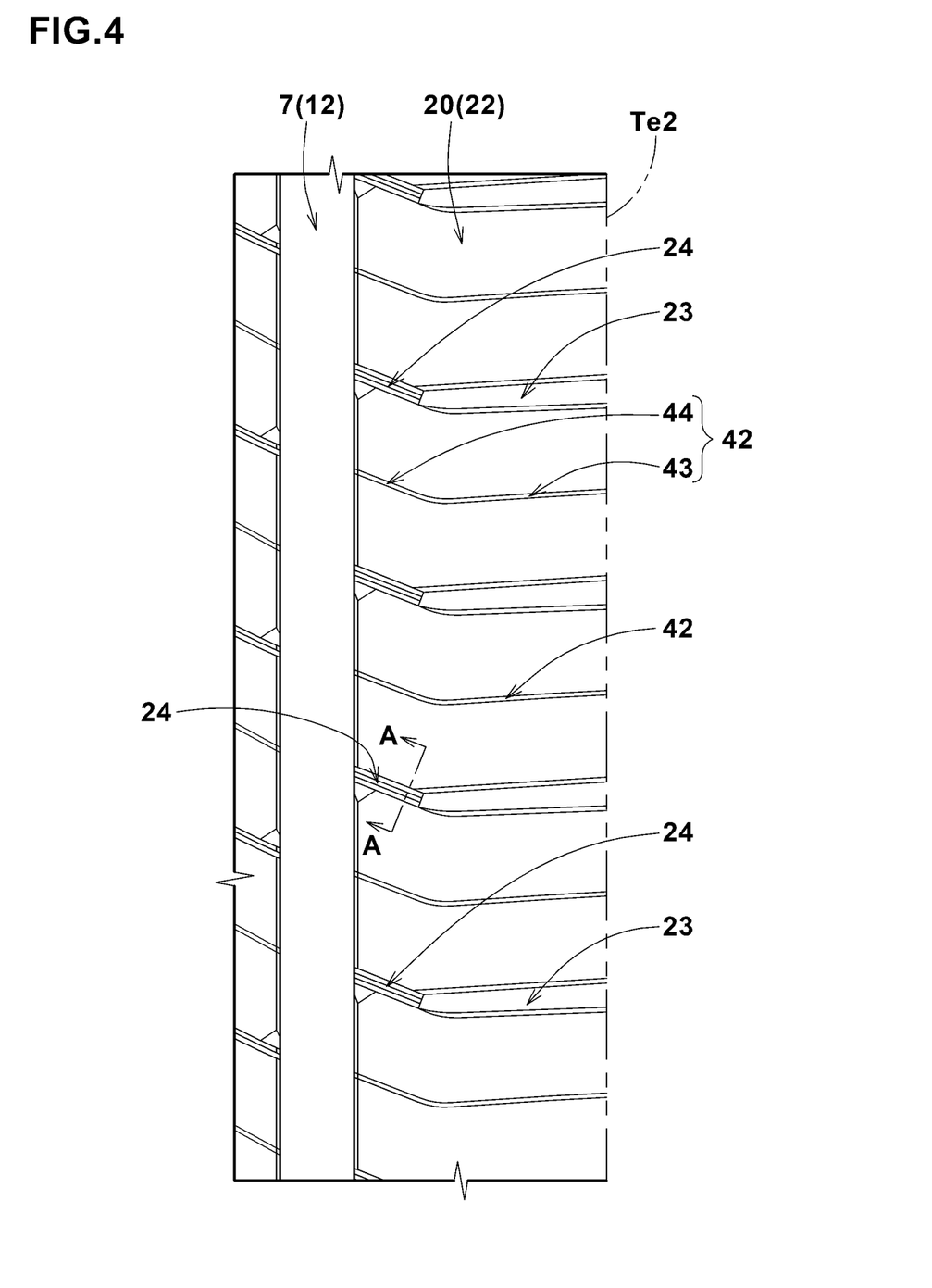
FIG. 4 is an enlarged view showing the inboard shoulder land region.

Block sections of the outboard middle land region 17 sectioned by the outboard middle sipes 40 are each provided with an oblique sipe 41 extending along a diagonal line of the block section. The oblique sipes 41 generate friction in the tire axial direction and circumferential direction during wet running. In the present embodiment, as shown in FIG. 4, the inboard shoulder land region 22 is provided with a plurality of inboard shoulder sipes 42 in addition to the above-said shoulder rug grooves 23 and connecting sipes 24.

The inboard shoulder sipes 42 extend from the inboard shoulder main groove 12 to the inboard tread edge Te2, and are disposed alternately with the shoulder rug grooves 23.

The inboard shoulder sipes 42 include a bent one which comprises an axially outer part 43 extending straight from the inboard tread edge Te2 toward the axially inside, and an axially inner part 44 extending straight from the axially inner end of the axially outer part 43 to the inboard shoulder main groove 12 at a certain angle with respect to the axially outer part 43.

As compared to a straight sipe, such bent sipe 42 can effectively prevent the occurrence of shearing deformation in the tire axial direction of the land region by the opposite side walls of the sipe coming into contact with one another.

In the present embodiment, each of the inboard shoulder sipes 42 is the bent inboard shoulder sipe 42.

Figure 5:
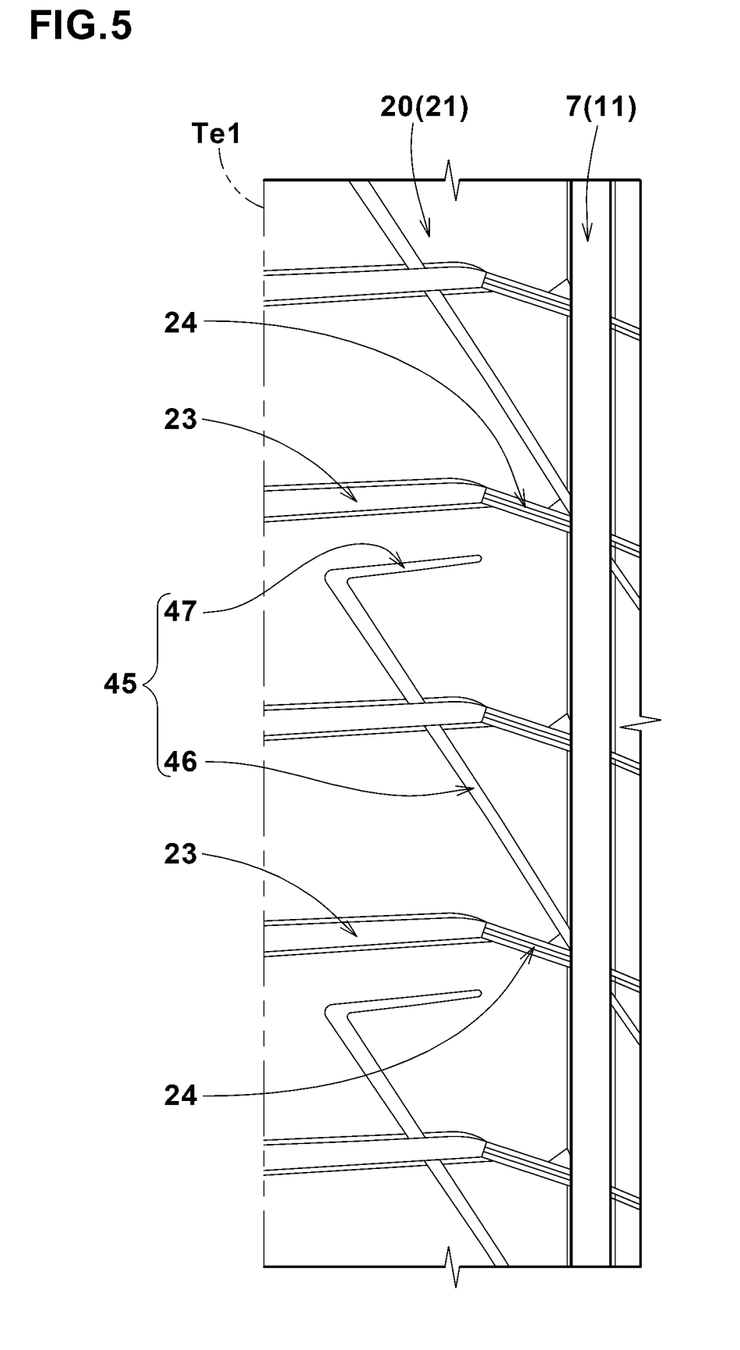
FIG. 5 is an enlarged view showing the outboard shoulder land region.

In the present embodiment, the outboard shoulder land region 21 is provided with shallow grooves 45 in addition to the above-said shoulder rug grooves 23 and connecting sipes 24. As shown in FIG. 5, the shallow groove 45 is a bent groove composed of a first part 46 extending obliquely and axially outwardly from the outboard shoulder main groove 11 and intersecting one of the shoulder rug grooves 23, and a second part 47 extending axially inwardly from the axially outer end of the first part 46.

Such shallow grooves 45 serve to improve cornering performance during wet running.

It is preferable that, as shown in FIG. 1, the sipes on both sides of each main groove are smoothly continued through the main groove, more specifically, the connecting sipes 24 are respectively smoothly continued to the outboard middle sipe 40 through the outboard shoulder main groove 11, the outboard middle sipes 40 are respectively smoothly continued to the outboard crown sipes 34 through the outboard crown main groove 13, the connecting sipes 24 are respectively smoothly continued to the second inboard middle sipes 37 through the inboard shoulder main groove 12, the inboard shoulder sipes 42 are respectively smoothly continued to the first inboard middle sipes 36 through the inboard shoulder main groove 12, and the first inboard middle sipes 36 are respectively smoothly continued to the inboard crown sipes 33 through the inboard crown main groove 14.

Such sipe arrangement serve to allow the land regions to deform in the same mode to exert superior steering stability.

Figure 6A:
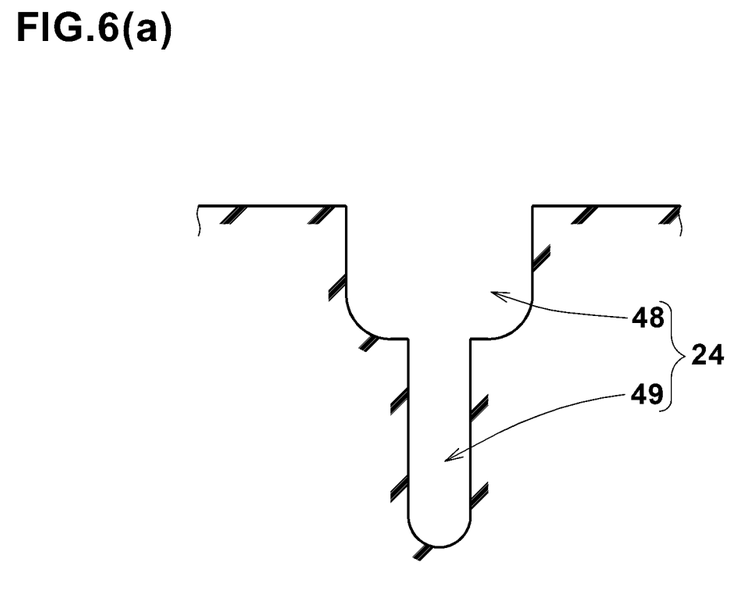
FIG. 6(a) is a cross sectional view taken along line A-A of FIG. 4.
Figure 6B:
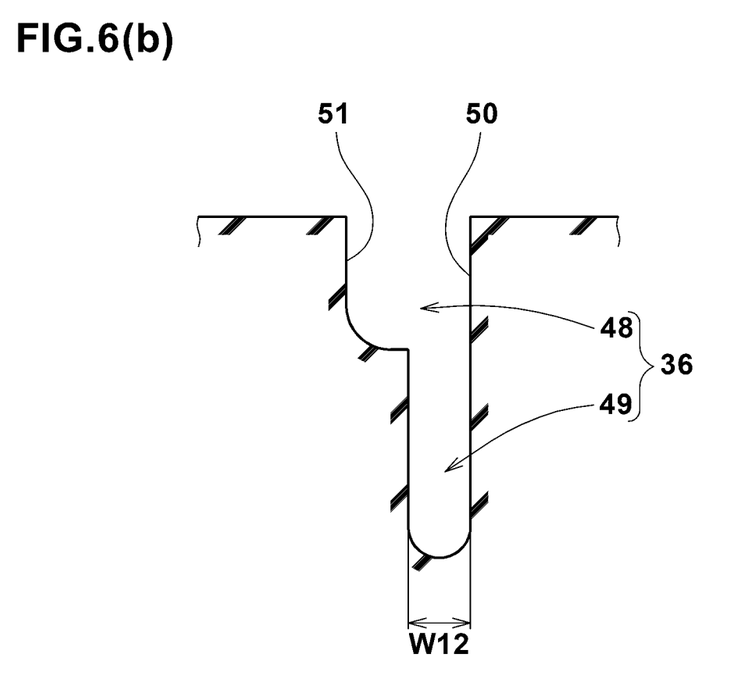
FIG. 6(b) is a cross sectional view taken along line B-B of FIG. 3.

It is preferable that, as shown in FIG. 6(a) and FIG. 6(b), each of the connecting sipes, middle sipes and crown sipes comprises a radially outer wide part 48 opened at the tread face, and a radially inner narrow part 49 having a width less than the width at the opening.

It is preferable that, as shown in FIG. 6(b), in the cross section perpendicular to the longitudinal direction, each of the crown sipes and middle sipes has a first sipe side wall 50 extending straight from the opening to the bottom, and a second sipe side wall 51 being opposite to the first sipe side wall 50 and extending steppedly so as to change the width of the sipe. Such sipe generates a larger frictional force by the edge of the first sipe side wall 50 and improves grip performance during accelerating or decelerating.

while detailed description has been made of an especially preferable embodiment of the present invention, the present invention can be embodied in various forms without being limited to the illustrated embodiment.

Comparison Tests

Figure 7:
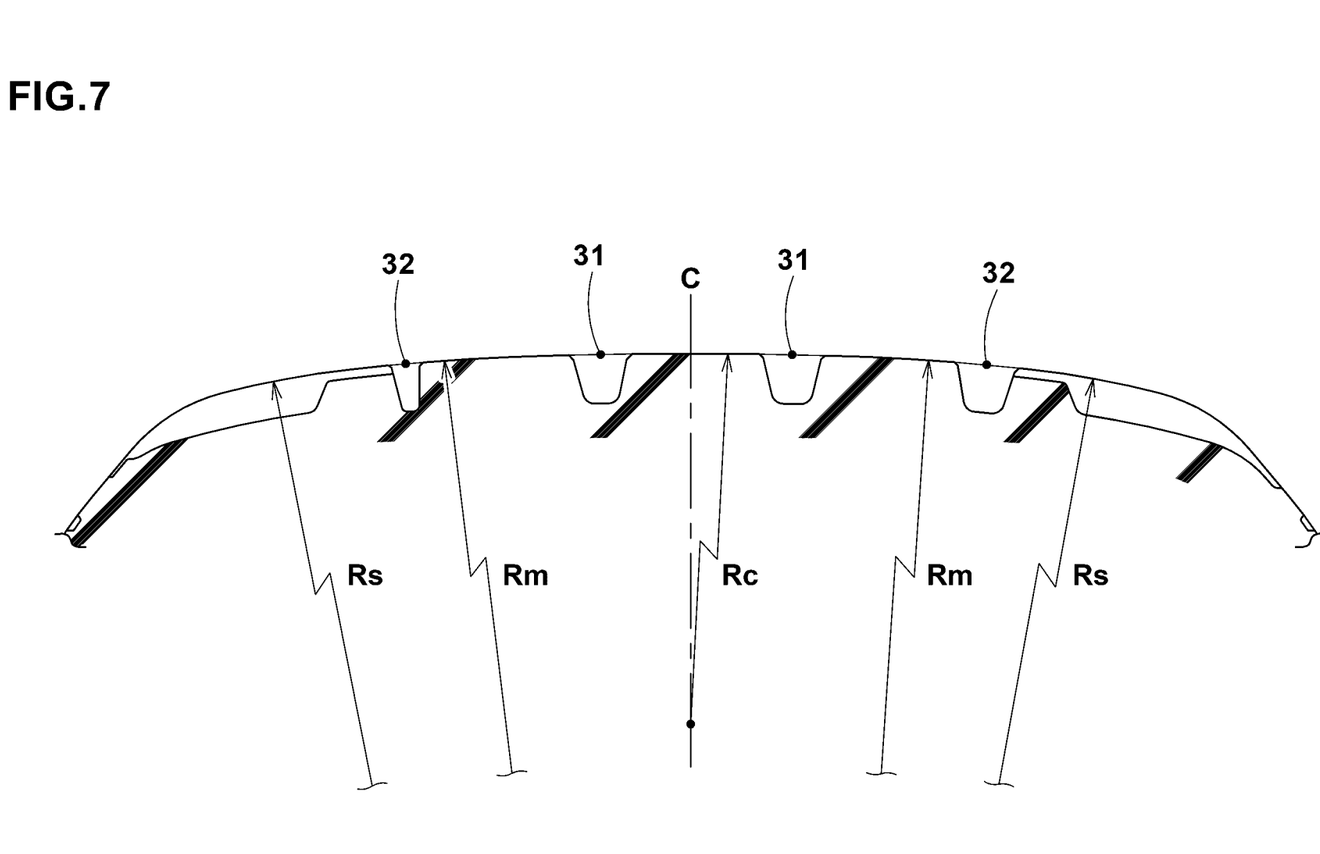
FIG. 7 is a cross sectional view of a pneumatic tire as a comparative example under the normally inflated unloaded condition.

Based on the tread pattern shown in FIG. 1, test tires of size 215/60R16 (rim size 16×7.0J) where experimentally manufactured and tested for the steering stability and ride comfort. The test tires included working example tires (Ex1-Ex15) having the tread profile shown in FIG. 2, and Comparative example tire (Ref) having a tread profile shown in FIG. 7 having the first interconnecting position 31 within the width of the crown main groove and the second interconnecting position 32 within the width of the shoulder main groove.

Specifications are listed in Table 1.

<Steering Stability Test> using a test car (2500 cc rear-drive passenger car) provided on all wheels with test tires inflated to 250 kPa, a test driver evaluated the steering stability during running on a dry road. The results are indicated in Table 1 by an index based on Comparative example being 100, wherein the larger the value, the better the steering stability.

<Ride Comfort Test> using the above-mentioned test car, the test driver evaluated the ride comfort during running on the dry road.

The results are indicated in Table 1 by an index based on Comparative example being 100, wherein the larger the value, the better the ride comfort.

TABLE 1

| Tire | Ref | Ex1 | Ex2 | Ex3 | Ex4 | Ex5 | Ex6 | Ex7 |
| --- | --- | --- | --- | --- | --- | --- | --- | --- |
| tread profile (FIG. No.) | 7 | 1 | 1 | 1 | 1 | 1 | 1 | 1 |
| Rc (mm) | 1500 | 1500 | 500 | 2500 | 1500 | 1500 | 1500 | 1500 |
| Rm/Rc | 0.60 | 0.60 | 0.60 | 0.60 | 0.50 | 0.55 | 0.65 | 0.70 |
| Rs/Rc | 0.25 | 0.25 | 0.25 | 0.25 | 0.25 | 0.25 | 0.25 | 0.25 |
| L4/W5 | 0.25 | 0.25 | 0.25 | 0.25 | 0.25 | 0.25 | 0.25 | 0.25 |
| steering stability | 100 | 107 | 104 | 108 | 105 | 106 | 107 | 108 |
| ride comfort | 100 | 105 | 106 | 103 | 105 | 104 | 104 | 102 |

TABLE 1-continued

| Tire | Ex8 | Ex9 | Ex10 | Ex11 | Ex12 | Ex13 | Ex14 | Ex15 |
|---|---|---|---|---|---|---|---|---|
| tread profile (FIG. No.) | 1 | 1 | 1 | 1 | 1 | 1 | 1 | 1 |
| Rc (mm) | 1500 | 1500 | 1500 | 1500 | 1500 | 1500 | 1500 | 1500 |
| Rm/Rc | 0.60 | 0.60 | 0.60 | 0.60 | 0.60 | 0.60 | 0.60 | 0.60 |
| Rs/Rc | 0.15 | 0.20 | 0.30 | 0.35 | 0.25 | 0.25 | 0.25 | 0.25 |
| L4/W5 | 0.25 | 0.25 | 0.25 | 0.25 | 0.15 | 0.20 | 0.27 | 0.30 |
| steering stability | 104 | 106 | 107 | 107 | 104 | 106 | 107 | 107 |
| ride comfort | 106 | 105 | 105 | 104 | 106 | 105 | 105 | 103 |

Form the test results, it was confirmed that the pneumatic tires according to the present invention were improved in the steering stability and ride comfort.

REFERENCE SIGNS LIST 2 tread portion
7 shoulder main groove
8 crown main groove
15 crown land region
16 middle land region
20 shoulder land region
23 shoulder rug groove
24 connecting sipe
25 crown tread profile
26 middle tread profile
27 shoulder tread profile
31 first interconnecting position
32 second interconnecting position
C tire equator
Rc radius of curvature of crown tread profile
Rm radius of curvature of middle tread profile
Rs radius of curvature of shoulder tread profile

The invention claimed is:

1. A pneumatic tire comprising:
a tread portion provided with four circumferentially continuously extending main grooves including a pair of crown main grooves and a pair of shoulder main grooves so that the tread portion is axially divided into five land regions including a crown land region disposed on the tire equator, two axially outermost shoulder land regions and two middle land regions, wherein
the crown land region and the middle land regions are provided with only sipes defined as having a width of less than 2 mm,
the shoulder land regions are each provided with shoulder lug grooves each extending axially inwardly from the adjacent tread edge to have an axially inner end within the shoulder land region, and connecting sipes extending from the axially inner ends of the respective shoulder lug grooves to the adjacent shoulder main groove,
in a meridional cross section of the tire under a normally inflated unloaded condition, the tread portion is provided with a tread profile made up of a crown tread profile including the tire equator, a middle tread profile on each side of the crown tread profile, and a shoulder tread profile on the axially outside of each of the middle tread profiles,
the crown tread profile which is a radially outwardly convexed arc having a radius of curvature Rc, the middle tread profile which is a radially outwardly convexed arc having a radius of curvature Rm, and the shoulder tread profile which is a radially outwardly convexed arc having a radius of curvature Rs satisfy a magnitude relation Rc >Rm >Rs,
first interconnecting positions at which the crown tread profile connects with the middle tread profiles are positioned in the respective middle land regions,
second interconnecting positions at which the middle tread profiles connect with the shoulder tread profiles are positioned in the respective shoulder land regions and axially inside the inner ends of the shoulder lug grooves, and
each of the middle land regions has an axial width W6 between its axially inner edge and axially outer edge, and an axial distance L2 between the axially inner edge of the middle land region and the first interconnecting position is in a range from 0.40 to 0.60 times the axial width W6.

2. The pneumatic tire according to claim 1, wherein
the radius of curvature Rc is 500 to 2500 mm,
the radius of curvature Rm is 0.50 to 0.70 times the radius of curvature Rc, and
the radius of curvature Rs is 0.15 to 0.35 times the radius of curvature Rc.

3. The pneumatic tire according to claim 1, wherein
the axial length of each of the connecting sipes is 0.15 to 0.30 times the axial width of the shoulder land regions.

4. The pneumatic tire according to claim 1, wherein
each of the middle land regions is provided with a plurality of middle sipes extending across the entire width of the middle land region, and
the crown land region is provided with a plurality of crown sipes extending from the crown main grooves and terminating within the crown land region.

5. The pneumatic tire according to claim 4, wherein
each of the middle sipes is continued to one of the connecting sipes through the shoulder main groove.

6. The pneumatic tire according to claim 4, wherein
each of the crown sipes is continued to one of the middle sipes through the crown main groove.

7. The pneumatic tire according to claim 4, wherein
the connecting sipes, the middle sipes and the crown sipes each comprises a radially outer wide part opened at the tread face, and a radially inner narrow part having a width less than the width at the opening of the wide part.

8. The pneumatic tire according to claim 2, wherein
the axial length of each of the connecting sipes is 0.15 to 0.30 times the axial width of the shoulder land regions.

9. The pneumatic tire according to claim 2, wherein
each of the middle land regions is provided with a plurality of middle sipes extending across the entire width of the middle land region, and
the crown land region is provided with a plurality of crown sipes extending from the crown main grooves and terminating within the crown land region.

10. The pneumatic tire according to claim 3, wherein
each of the middle land regions is provided with a plurality of middle sipes extending across the entire width of the middle land region, and
the crown land region is provided with a plurality of crown sipes extending from the crown main grooves and terminating within the crown land region.

11. The pneumatic tire according to claim 5, wherein
each of the crown sipes is continued to one of the middle sipes through the crown main groove.

12. The pneumatic tire according to claim 5, wherein
the connecting sipes, the middle sipes and the crown sipes each comprises a radially outer wide part opened at the tread face, and a radially inner narrow part having a width less than the width at the opening of the wide part.

13. The pneumatic tire according to claim 6, wherein
the connecting sipes, the middle sipes and the crown sipes each comprises a radially outer wide part opened at the tread face, and a radially inner narrow part having a width less than the width at the opening of the wide part.

14. The pneumatic tire according to claim 1, wherein
the tread portion is provided with an asymmetrical tread pattern for which a mounting position of the tire is specified such that the tread edges are an outboard tread edge (Te1) to be positioned away from the center of a vehicle body, and an inboard tread edge (Te2) to be positioned close to the center of the vehicle body, and
one of the shoulder main grooves which is adjacent to the outboard tread edge has a smallest groove width W1 in the main grooves and the groove width W1 is from 2% to 4% of a tread width TW between the outboard tread edge and the inboard tread edge.

15. The pneumatic tire according to claim 14, wherein
the crown main grooves and the shoulder main groove adjacent to the inboard tread edge have a width of from 3% to 7% of the tread width TW.

16. The pneumatic tire according to claim 1, wherein
the shoulder lug grooves are inclined at angles of not more than 5 degrees with respect to the tire axial direction,
the connecting sipes are inclined at angles of from 20 to 30 degrees with respect to the tire axial direction, and
with respect to the tire axial direction, the shoulder lug grooves are inclined to one direction, and the connecting sipes are inclined to the opposite direction to the shoulder lug grooves.

17. The pneumatic tire according to claim 15, wherein
the shoulder lug grooves are inclined at angles of not more than 5 degrees with respect to the tire axial direction,
the connecting sipes are inclined at angles of from 20 to 30 degrees with respect to the tire axial direction, and
with respect to the tire axial direction, the shoulder lug grooves are inclined to one direction, and the connecting sipes are inclined to the opposite direction to the shoulder lug grooves.

18. The pneumatic tire according to claim 1, wherein
the connecting sipes have an axial length L4, and
in each of the shoulder land regions, an axial distance L3 between an axially inner edge of the shoulder land region and the second interconnecting position is in a range from 0.40 to 0.60 times the axial length L4 of the connecting sipes.

19. A pneumatic tire comprising:
a tread portion provided with four circumferentially continuously extending main grooves including a pair of crown main grooves and a pair of shoulder main grooves so that the tread portion is axially divided into five land regions including a crown land region disposed on the tire equator, two axially outermost shoulder land regions and two middle land regions, wherein
the crown land region and the middle land regions are provided with only sipes defined as having a width of less than 2 mm,
the shoulder land regions are each provided with shoulder lug grooves each extending axially inwardly from the adjacent tread edge to have an axially inner end within the shoulder land region, and connecting sipes extending from the axially inner ends of the respective shoulder lug grooves to the adjacent shoulder main groove,
in a meridional cross section of the tire under a normally inflated unloaded condition, the tread portion is provided with a tread profile made up of a crown tread profile including the tire equator, a middle tread profile on each side of the crown tread profile, and a shoulder tread profile on the axially outside of each of the middle tread profiles,
the crown tread profile which is a radially outwardly convexed arc having a radius of curvature Rc, the middle tread profile which is a radially outwardly convexed arc having a radius of curvature Rm, and the shoulder tread profile which is a radially outwardly convexed arc having a radius of curvature Rs satisfy a magnitude relation Rc >Rm >Rs,
first interconnecting positions at which the crown tread profile connects with the middle tread profiles are positioned in the respective middle land regions,
second interconnecting positions at which the middle tread profiles connect with the shoulder tread profiles are positioned in the respective shoulder land regions and axially inside the inner ends of the shoulder lug grooves,
the tread portion is provided with an asymmetrical tread pattern for which a mounting position of the tire is specified such that the tread edges are an outboard tread edge (Te1) to be positioned away from the center of a vehicle body, and an inboard tread edge (Te2) to be positioned close to the center of the vehicle body,
one of the shoulder main grooves which is adjacent to the outboard tread edge has a smallest groove width W1 in the main grooves and the groove width W1 is from 2% to 4% of a tread width TW between the outboard tread edge and the inboard tread edge,
the crown main grooves and the shoulder main groove adjacent to the inboard tread edge have a width of from 3% to 7% of the tread width TW,
the shoulder lug grooves are inclined at angles of not more than 5 degrees with respect to the tire axial direction,
the connecting sipes are inclined at angles of from 20 to 30 degrees with respect to the tire axial direction,
with respect to the tire axial direction, the shoulder lug grooves are inclined to one direction, and the connecting sipes are inclined to the opposite direction to the shoulder lug grooves,
each of the middle land regions has an axial width W6 between its axially inner edge and axially outer edge, and an axial distance L2 between the axially inner edge of the middle land region and the first interconnecting position is in a range from 0.40 to 0.60 times the axial width W6,
the connecting sipes have an axial length L4, and
in each of the shoulder land regions, an axial distance L3 between an axially inner edge of the shoulder land region and the second interconnecting position is in a range from 0.40 to 0.60 times the axial length L4 of the connecting sipes.

\* \* \* \* \*